(12) United States Patent
Karczewicz et al.

(10) Patent No.: US 7,477,689 B2
(45) Date of Patent: Jan. 13, 2009

(54) VIDEO DECODER ARCHITECTURE AND METHOD FOR USING SAME

(75) Inventors: Marta Karczewicz, Irving, TX (US); Ragip Kurceren, Irving, TX (US)

(73) Assignee: Nokia Corporation, Espoo (FI)

( * ) Notice: Subject to any disclaimer, the term of this patent is extended or adjusted under 35 U.S.C. 154(b) by 244 days.

(21) Appl. No.: 10/869,628

(22) Filed: Jun. 16, 2004

(65) Prior Publication Data

US 2005/0185715 A1    Aug. 25, 2005

Related U.S. Application Data

(63) Continuation of application No. 09/883,887, filed on Jun. 18, 2001, now Pat. No. 6,765,963, which is a continuation of application No. 09/827,796, filed on Apr. 6, 2001, now abandoned.

(60) Provisional application No. 60/259,529, filed on Jan. 3, 2001.

(51) Int. Cl.
*H04N 7/12* (2006.01)
*H04B 1/66* (2006.01)

(52) U.S. Cl. .................................. 375/240.03

(58) Field of Classification Search ................ 375/240.01–240.29
See application file for complete search history.

(56) References Cited

U.S. PATENT DOCUMENTS

| | | | |
|---|---|---|---|
| 5,386,234 | A | 1/1995 | Veltman et al. |
| 5,903,310 | A | 5/1999 | Finotello et al. |
| 6,012,091 | A | 1/2000 | Boyce |
| 6,137,834 | A | 10/2000 | Wine et al. |
| 6,160,844 | A | 12/2000 | Wilkinson |
| 6,163,575 | A | 12/2000 | Nieweglowski et al. |
| 6,175,595 | B1 | 1/2001 | Keesman |
| 6,192,078 | B1 | 2/2001 | Komiya et al. |
| 6,212,235 | B1 | 4/2001 | Nieweglowski et al. |
| 6,229,854 | B1 | 5/2001 | Kikuchi et al. |

(Continued)

FOREIGN PATENT DOCUMENTS

CA    2 274 181    6/1998

(Continued)

OTHER PUBLICATIONS

Patent Abstract, publication No. JP02078584A2, "Printing Control Method and Device Therefor", Tsukada Masayuki et al.

(Continued)

*Primary Examiner*—Nhon T. Diep

(57) ABSTRACT

A decoder and method for using a new picture or frame type is provided. This type is referred to a an SP-picture. The temporal redundancies are not exploited in I-frames, compression efficiency of I-frame coding is significantly lower than the predictive coding. A method allows use of motion compensated predictive coding to exploit temporal redundancy in the sequence while still allowing perfect reconstruction of the frame using different reference frames. Methods using this new picture type provide for error resilience/recovery, bandwidth scalability, bitstream switching, processing scalability, random access and other functions.

The SP-type picture provides for, among other functions, switching between different bitstreams, random access, fast forward and fast error-recovery by replacing I-pictures to increase the coding efficiency. As will be demonstrated, SP-pictures have the property that identical SP-frames may be obtained even when they are predicted using different reference frames.

5 Claims, 6 Drawing Sheets

U.S. PATENT DOCUMENTS

| | | | |
|---|---|---|---|
| 6,380,991 B1 * | 4/2002 | Teichmer | 375/240.01 |
| 6,393,055 B1 * | 5/2002 | Martin | 375/240 |
| 6,393,057 B1 | 5/2002 | Thoreau et al. | |
| 6,414,999 B1 | 7/2002 | Igi et al. | |
| 6,434,195 B1 * | 8/2002 | Luthra et al. | 375/240.12 |
| 6,452,971 B1 | 9/2002 | Iwasaki et al. | |
| 6,493,389 B1 | 12/2002 | Bailleul | |
| 6,501,798 B1 | 12/2002 | Sivan | |
| 6,516,002 B1 | 2/2003 | Huang et al. | |
| 6,529,555 B1 | 3/2003 | Saunders et al. | |
| 6,611,624 B1 | 8/2003 | Zhang et al. | |
| 6,618,438 B1 | 9/2003 | LeRoux et al. | |
| 6,633,678 B2 | 10/2003 | Boon | |
| 6,658,056 B1 | 12/2003 | Durouz et al. | |
| 6,760,377 B1 * | 7/2004 | Burns et al. | 375/240.15 |
| 6,765,963 B2 | 7/2004 | Karczewicz et al. | |
| 2002/0118755 A1 | 8/2002 | Karczewicz et al. | |
| 2003/0142744 A1 | 7/2003 | Wu et al. | |
| 2004/0013202 A1 | 1/2004 | Lainema | |

FOREIGN PATENT DOCUMENTS

| | | |
|---|---|---|
| EP | 1045589 | 10/2000 |
| EP | 1079631 | 2/2001 |
| WO | 9114340 | 9/1991 |
| WO | 01/11891 | 2/2001 |

OTHER PUBLICATIONS

Patent Abstract, publication No. JP2000188759A2, "High Frame Precision Seamless Splicing Method for Information", Christopher Ward et al.

Patent Abstract, publication No. JP2001119305A2, "Signal Processor", Nicholas Ian Saunders et al.

Patent Abstracts of Japan, publication No. 02154110A, "Water Depth Measuring Device" Yoji Yoshida.

ITU-Telecommunications Standardization Sector, Document VCEG-L45.

ITU-Telecommunications Standardization Sector, Document Q15-K-59.

ITU-Telecommunications Standardization Sector, Document Q15-I-62.

ITU-Telecommunications Standardization Sector, Document Q15-H-07.

ITU-Telecommunications Standardization Sector, Document Q15-G-11.

ITU-Telecommunications Standardization Sector, Document Q15-D-17, "Error Resilience Support in H.263+".

Farber, N. et al; "Robust H.263 Compatible Video Transmission for Mobile Access to Video Servers;" IEEE 1997; 0-8186-8183-7/97.

Patent abstracts of Japan, Abstract of JP 12-165816, Sony Corporation, Jun. 16, 2000, abstract.

* cited by examiner

VIDEO DECODER ARCHITECTURE AND METHOD FOR USING SAME

CROSS REFERENCE TO RELATED APPLICATIONS

This application is a continuation of application Ser. No. 09/883,887, now U.S. Pat. No. 6,785,963, filed on Jun. 18, 2001, and issued on Jul. 20, 2004, which is a continuation of U.S. patent application Ser. No. 09/827,796 filed on Apr. 6, 2001, now abandoned entitled VIDEO DECODER ARCHITECTURE AND METHOD FOR USING SAME and claims priority from same and Provisional Application No. 60/259,529 filed on Jan. 3, 2001, both incorporated herein by reference.

BACKGROUND

This invention relates generally to the field of the multimedia applications. More particularly, this invention relates to a new frame type, apparatus and method for using same to provide for access of a video stream.

Multimedia applications that include audio and streaming video information have come into greater use. Several multimedia groups have established and proposed standards for compressing/encoding and decompressing/decoding the audio and video information. The examples are MPEG standards, established by the Motion Picture Expert Group and standards developed by ITU-Telecommunications Standardization.

The following are incorporated herein by reference:

G. Bjontegaard, "H.26L Test Model Long Term Number 6 (TML-6) draft0", document VCEG-L45, ITU-T Video Coding Experts. Group Meeting, Eibsee, Germany, 9-12 Jan. 2001. Keiichi Hibi, "Report of the Ad Hoc Committee on H.26L Development", document Q15-H-07, ITU-T Video Coding Experts Group (Question 15) Meeting, Berlin, 3-6 Aug., 1999. Gary S. Greenbaum, "Remarks on the H.26L Project: Streaming Video Requirements for Next Generation Video Compression Standards", document Q15-G-11, ITU-T Video Coding Experts Group (Question 15) Meeting, Monterey, 16-19 Feb., 1999. G. Bjontegaard, "Recommended Simulation Conditions for H.26L", document Q15-I-62, ITU-T Video Coding Experts Group (Question 15) Meeting, Red Bank, N.J. 19-22 Oct., 1999. ATM & MPEG-2 Integrating Digital Video into Broadband Networks by Michael Orzessek and Peter Sommer (Prentice Hall Upper Saddle River N.J.).

Video sequences, like ordinary motion pictures recorded on film, comprise a sequence of still images, and the illusion of motion is created by displaying consecutive images at a relatively fast rate. For example, the display rate are between five and thirty frames per second. Because of the relatively fast frame rate, the images in consecutive frames tend to be similar. A typical scene recorded by a camera comprises some stationary elements, such as, for example, background scenery and some moving parts. The moving parts may take many different forms, for example, the face of a news reader, moving traffic, and so on. Alternatively, the camera recording the scene may itself be moving, in which case all elements of the image have the same kind of motion. In many cases, this means that the overall change between one video frame and the next is rather small. Of course, this depends on the nature of the movement, the rate of the movement, i.e., the amount of change from one frame to the next.

The purpose of the video coding is to remove the redundancy in the image sequence so that the encoded data rate is commensurate with the available bandwidth to transport the video sequence while keeping the distortion between the original and reconstructed images as small as possible. The redundancy in video sequences can be categorized into spatial and temporal redundancy. Spatial redundancy refers to the correlation between neighboring pixels in a frame while temporal redundancy refers to correlation between neighboring frames.

FIGS. 1A-1C illustrate the type of encoded/compressed video frames that are commonly utilized for video standards. FIG. 1A depicts an Intra-frame or I-type frame 200. The I-type frame or picture is a frame of video data that is coded exploiting only the spatial correlation of the pixels within the frame without using information from the past or the future and is utilized as the basis for decoding/decompression of other type frames. FIG. 1B is a representation of a Predictive-frame or P-type frame 210. The P-type frame or picture is a frame that is encoded/compressed using motion compensated prediction from I-type or P-type frames of its past, in this case, $I_1$ 200. That is, previous frames are used to encode/compress a present given frame of video data. 205a represents the motion compensated prediction information to create a P-type frame 210. Since in a typical video sequence the adjacent frames in a sequence are highly correlated, higher compression efficiencies are achieved when using P-frames.

FIG. 1C depicts a Bi-directional-frame or B-type frame 220. The B-type frame or picture is a frame that is encoded/compressed using a motion compensated prediction derived from the I-type reference frame (200 in this example) or P-type reference frame in its past and the I-type reference frame or P-type reference frame (210 in this example) in its future or a combination of both. B-type frames are usually inserted between I-type frames or P-type frames. FIG. 2 represents a group of pictures in what is called display order $I_1$ $B_2$ $B_3$ $P_4$ $B_5$ $P_6$. FIG. 2 illustrates the B-type frames inserted between I-type and P-type frames and the direction which motion compensation information flows.

A system for P-frame encoding and decoding is provided and is shown in FIGS. 3 and 4. Referring to FIGS. 3 and 4, a communication system comprising an encoder 300 of FIG. 3 and a decoder 400 of FIG. 4 is operable to communicate a multimedia sequence between a sequence generator and a sequence receiver. Other elements of the video sequence generator and receiver are not shown for the purposes of simplicity. The communication path between sequence generator and receiver may take various forms, including but not limited to a radio-link.

Encoder 300 is shown in FIG. 3 coupled to receive video input on line 301 in the form of a frame to be encoded I(x, y), called the current frame. By (x, y) we denote location of the pixel within the frame. In the encoder the current frame I(x,y) is partitioned into rectangular regions of M×N pixels. These blocks are encoded using either only spatial correlation (intra coded blocks) or both spatial and temporal correlation (inter coded blocks). In what follows we concentrate on inter blocks.

Each of inter coded blocks is predicted using motion information from the previously coded and transmitted frame, called reference frame and denoted as R(x,y), which at given instant is available in the frame memory 350 of the encoder 300. The motion information of the block may be represented by two dimensional motion vector ($\Delta x(x,y)$, $\Delta y(x,y)$) where $\Delta x(x,y)$ is the horizontal and $\Delta y(x,y)$ is the vertical displacement, respectively of the pixel in location (x,y) between the current frame and the reference frame. The motion vectors ($\Delta x(\ )$, $\Delta y(\ )$) are calculated by the motion estimation and coding block 370. The input to the motion estimation and coding block 370 are current frame and reference frame. The motion information is provided to a Motion Compensated (MC) prediction block 360. The MC prediction block is also coupled to a frame memory 350 to receive the reference frame. In the MC block 360, the motion vectors for each inter block together with the reference frame are used to construct prediction frame P(x, y):

$$P(x,y)=R(x+\Delta x(x,y), y+\Delta y(x,y)).$$

Notice that values of the prediction frame are calculated only for inter blocks. For some pixels (x,y) which belong to intra blocks these values will not be calculated. It is also possible to use more than one reference frame. In such case different blocks may use different reference frames.

Subsequently, the prediction error E(x, y), i.e., the difference between the current frame and the prediction frame P(x, y) is calculated by:

$$E(x,y)=I(x,y)-P(x,y).$$

In transform block 310, the prediction error for each K×L block is represented as weighted sum of a transform basis functions f.sub.ij(x, y), $$E(x, y) = \sum_{i=1}^{K} \sum_{j=1}^{L} c.sub.err(i, j) f.sub.ij(x, y).$$

The weights c.sub.err(i,j), corresponding to the basis functions are called prediction error coefficients. Coefficients c.sub.err(i,j) can be calculated by performing so called forward transform. These coefficients are quantized in quantization block 320:

$$I.sub.err(i,j)=Q(c.sub.err(i,j),QP)$$

where I.sub.err(i, j) are the quantized coefficients. The operation of quantization introduces loss of information—the quantized coefficient can be represented with smaller number of bits. The level of compression (loss of information) is controlled by adjusting the value of the quantization parameter (QP).

The quantization block 320 is coupled to both a multiplexer 380 and an inverse quantization block 330 and in turn an inverse transform block 340. Blocks 330 and 340 provide decoded prediction error E.sub.c(x, y) which is added to the MC predicted frame P(x, y) by adder 345. These values can be further normalized and filtered and the result stored in frame memory 350.

Motion vectors and quantized coefficients are encoded using Variable Length Codes (VLC) which further reduce the number of bits needed for their representation. Encoded motion vectors and quantized coefficients as well as other additional information needed to represent each coded frame of the image sequence constitute a bitstream 415 which is transmitted to the decoder 400 of FIG. 4. Bitstream may be multiplexed 380 before transmission.

The special type of the inter coded blocks are copy coded blocks. For copy coded blocks values of both motion vectors and quantized prediction error coefficients I.sub.err are equal to 0.

FIG. 4 shows the decoder 400 of the communication system. Bitstream 415 is received from encoder 300 of FIG. 3. Bitstream 415 is demultiplexed via demultiplexer 410. Dequantized coefficients d.sub.err(i,j) are calculated in the inverse quantization block 420:

$$d.sub.err(i,j)=Q^{-1}(I.sub.err(i,j),QP).$$

In inverse transform block 430, the dequantized coefficients are used to obtain compressed prediction error by performing inverse transform:

$$E.sub.c(x, y) = \sum_{i=1}^{K} \sum_{j=1}^{L} d.sub.err(i, j) f.sub.ij(x, y).$$

The pixels of the current coded frame are reconstructed by finding the prediction pixels in the reference frame R(x,y) using the received motion vectors and then adding to the compressed prediction error in adder 435:

$$I.sub.c(x,y)=R(x+\Delta x,y+\Delta,y)+E.sub.c(x,y).$$

To obtain reconstructed image these values can be further normalized and filtered.

An example of a forward transform is provided by "H.26L Test Model Long Term Number 6 (TML-6) draft0", document VCEG-L45, ITU-T Video Coding Experts Group Meeting, Eibsee, Germany, 9-12 Jan. 2001. The forward transformation of some pixels a, b, c, d into 4 transform coefficients A, B, C, D is defined by:

$$A=13a+13b+13c+13d$$

$$B=17a+7b-7c-17d$$

$$C=13a-13b-13c+13d$$

$$D=7a-17b+17c-7d$$

The inverse transformation of transform coefficients A, B, C, D into 4 pixels a', b', c', d' is defined by:

$$a'=13A+17B+13C+7D$$

$$b'=13A+7B-13C-17D$$

$$c'=13A-7B-13C+17D$$

$$d'=13A-17B+13C-7D$$

The transform/inverse transform is performed for 4×4 blocks by performing defined above one dimensional transform/inverse transform both vertically and horizontally.

In "H.26L Test Model Long Term Number 6 (TML-6) draft0", document VCEG-L45, ITU-T Video Coding Experts Group Meeting, Eibsee, Germany, 9-12 Jan. 2001 for chroma component, an additional 2×2 transform for the DC coefficients is performed.

$$DCC(0,0)=(DC0+DC1+DC2+DC3)/2$$

$$DCC(1,0)=(DC0-DC1+DC2-DC3)/2$$

$$DCC(0,1)=(DC0+DC1-DC2-DC3)/2$$

$$DCC(1,1)=(DC0-DC1-DC2+DC3)/2$$

Definition of the corresponding inverse transform:

$$DC0=(DCC(0,0)+DCC(1,0)+DCC(0,1)+DCC(1,1))/2$$

$$DC1=(DCC(0,0)-DCC(1,0)+DCC(0,1)-DCC(1,1))/2$$

$$DC2=(DCC(0,0)+DCC(1,0)-DCC(0,1)-DCC(1,1))/2$$

$$DC3=(DCC(0,0)-DCC(1,0)-DCC(0,1)+DCC(1,1))/2$$

In "H.26L Test Model Long Term Number 6 (TML-6) draft0", document VCEG-L45, ITU-T Video Coding Experts Group Meeting, Eibsee, Germany, 9-12 Jan. 2001 to obtain values of reconstructed image the results of the inverse transform are normalized by shifting by 20 bits (with rounding).

An example of quantization/dequantization is provided by "H.26L Test Model Long Term Number 6 (TML-6) draft0", document VCEG-L45, ITU-T Video Coding Experts Group Meeting, Eibsee, Germany, 9-12 Jan. 2001. A coefficient c is quantized in the following way:

$$I=(c \times A(QP)+f \times 2^{20})//2^{20}$$

where f may be in the range (0-0.5) and f may have the same sign as c. By // division with truncation is denoted. The dequantized coefficient is calculated as follows:

$$d=I \times B(QP)$$

Values of A(QP) and B(QP) are given below:

A(QP=0, . . . , 31)=[620, 553, 492, 439, 391, 348, 310, 276, 246, 219, 195, 174, 155, 138, 123, 110, 98, 87, 78, 69, 62, 55, 49, 44, 39, 35, 31, 27, 24, 22, 19, 17];

B(QP=0, . . . , 31)=[3881, 4351, 4890, 5481, 6154, 6914, 7761, 8718, 9781, 10987, 12339, 13828, 15523, 17435, 19561, 21873, 24552, 27656, 30847, 34870, 38807, 43747, 49103, 54683, 61694, 68745, 77615, 89113, 100253, 109366, 126635, 141533];

Video streaming has emerged as one of the essential applications over the fixed internet and—in the near future over 3G multimedia networks. In streaming applications, the server starts streaming the pre-encoded video bitstream to the receiver upon a request from the receiver which plays the stream as it receives with a small delay. The problem with video streaming is that the best-effort nature of today's networks causes variations of the effective bandwidth available to a user due to the changing network conditions. The server should then scale the bitrate of the compressed video to accommodate these variations. In case of conversational services that are characterized by real-time encoding and point-to-point delivery, this is achieved by adjusting, on the fly, the source encoding parameters, such as quantization parameter or frame rate, based on the network feedback. In typical streaming scenarios when already encoded video bitstream is to be streamed to the client, the above solution can not be applied.

The simplest way of achieving bandwidth scalability in case of pre-encoded sequences is by producing multiple and independent streams of different bandwidth and quality. The server dynamically switches between the streams to accommodate variations of the bandwidth available to the client.

Now assume that we have multiple bitstreams generated independently with different encoding parameters, such as quantization parameter, corresponding to the same video sequence. Since encoding parameters are different for each bitstream, the reconstructed frames of different bitstreams at the same time instant will not be the same. Therefore when switching between bitstreams, i.e., starting to decode a bitstream, at arbitrary locations would lead to visual artifacts due to the mismatch between the reference frames used to obtain predicted frame. Furthermore, the visual artifacts will not only be confined to the switched frame but will further propagate in time due to motion compensated coding.

In the current video encoding standards, perfect (mismatch-free) switching between bitstreams is achieved possible only at the positions where the future frames/regions do not use any information previous to the current switching location, i.e., at I-frames. Furthermore, by placing I-frames at fixed (e.g. 1 sec) intervals, VCR functionalities, such as random access or "Fast Forward" and "Fast Backward" (increased playback rate) for streaming video content, are achieved. User may skip a portion of video and restart playing at any I-frame location. Similarly, increased playback rate can be achieved by transmitting only I-pictures. The drawback of using I-frames in these applications is that since I-frames are not allowed to utilize temporal redundancy they require much larger number of bits than P-frames.

The above-mentioned references are exemplary only and are not meant to be limiting in respect to the resources and/or technologies available to those skilled in the art.

SUMMARY

A new picture or frame type and method of using same is provided. This type of novel frame type is referred to as a SP-picture. SP-picture uses motion compensated predictive coding to exploit temporal redundancy in the sequence. The difference between SP and P-pictures is that using SP-pictures identical frames may be obtained even when different reference frames are used for prediction. This property allows SP-pictures to replace I-pictures in numerous applications such as switching from one bitstream to another, random access, fast-forward, fast-backward. At the same time since SP-frames unlike I-frames are utilizing motion compensated predictive coding they require smaller number of bits than I-frames.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention, for which reference should be made to the appended claims.

BRIEF DESCRIPTIONS OF THE DRAWINGS

DETAILED DESCRIPTION

A new decoder architecture is provided which has the property that identical frames may be obtained even when they are predicted using different reference frames. The picture type obtained using this structure will be called SP-frame also may be referred to as picture. This property allows SP-pictures to replace I-pictures in numerous applications such as switching from one bitstream to another, random access, fast-forward, fast-backward. Since unlike I-frames SP-frames are using motion compensated prediction they require a lot less bits than the I-frames.

Figure 1A:
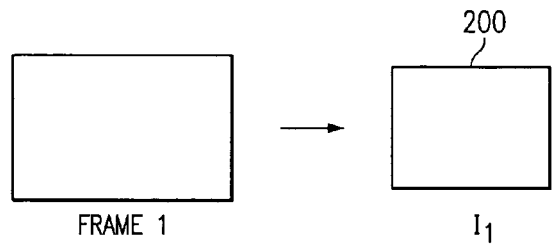
FIG. 1A is a diagram showing the encoding of an I-type frame or I-picture.
Figure 1B:
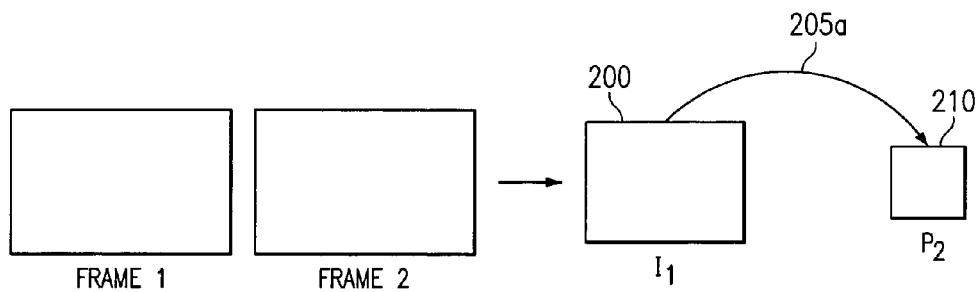
FIG. 1B is a diagram showing the encoding of a P-type frame or P-picture.
Figure 1C:
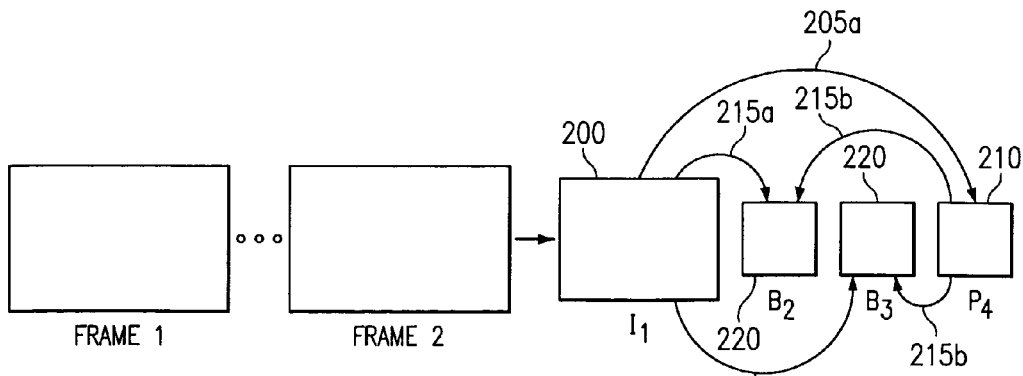
FIG. 1C is a diagram showing the encoding of a B-type frame or B-picture.
Figure 2:
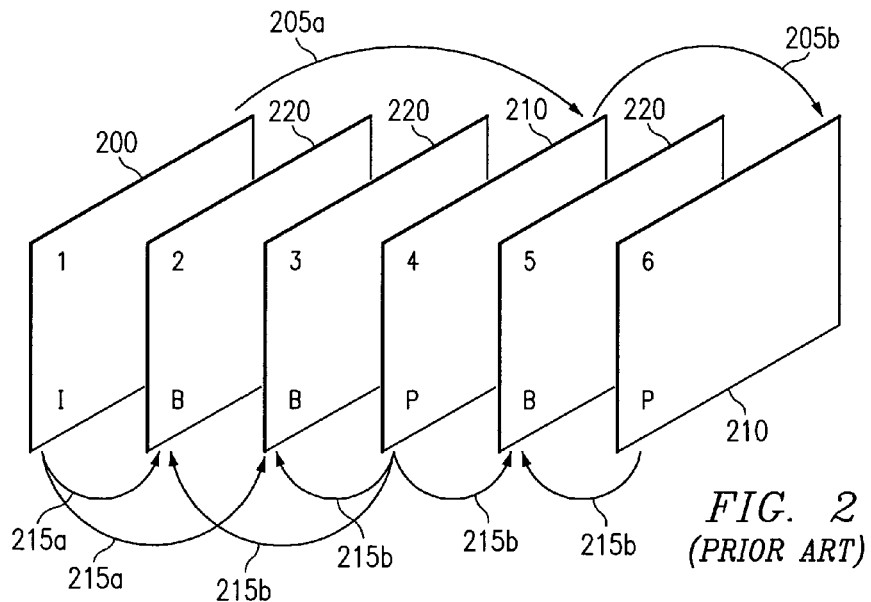
FIG. 2 is a diagram showing B-type frame inserted between I-type and P-type frames and the direction which motion compensation information flows.
Figure 3:
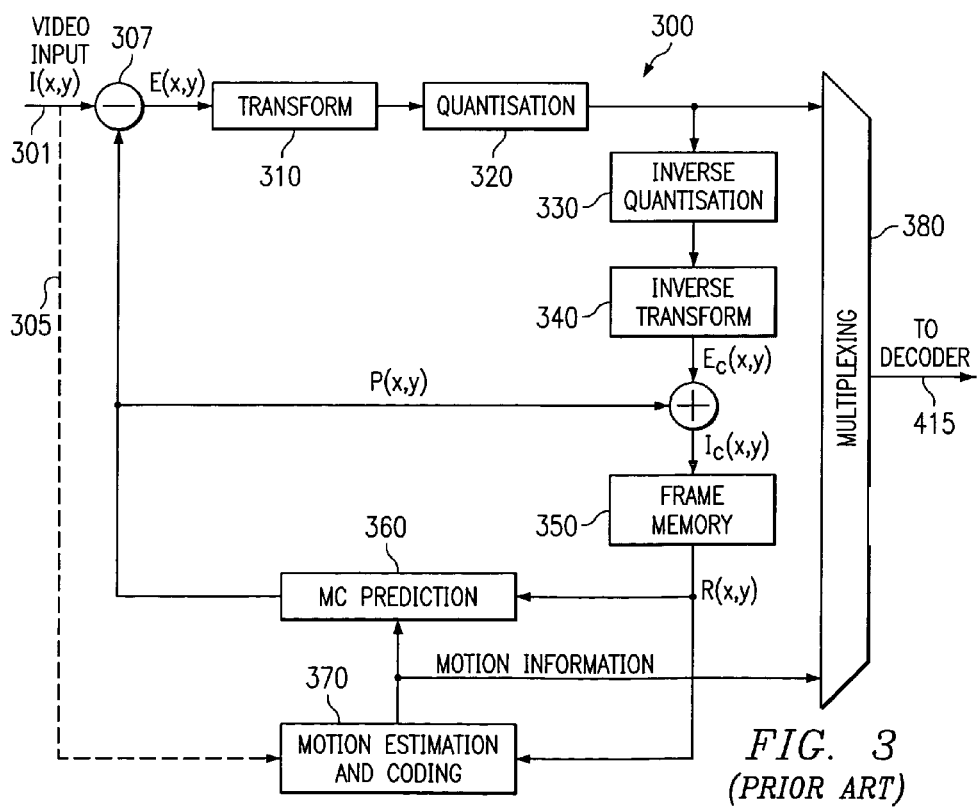
FIG. 3 is a block diagram of a generic motion-compensated predictive video coding system (encoder).
Figure 4:
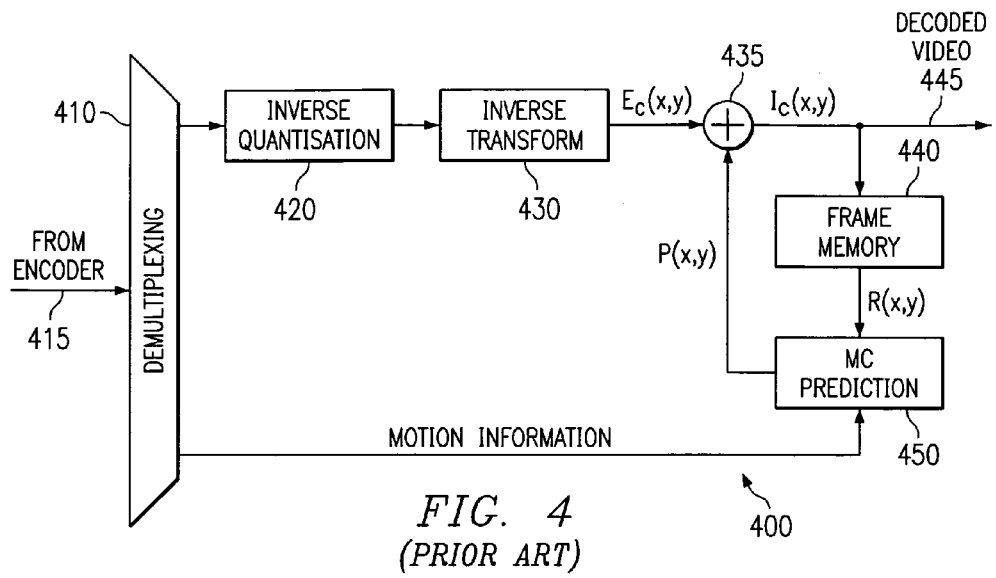
FIG. 4 is a block diagram of a generic motion-compensated predictive video coding system (decoder).
Figure 5:
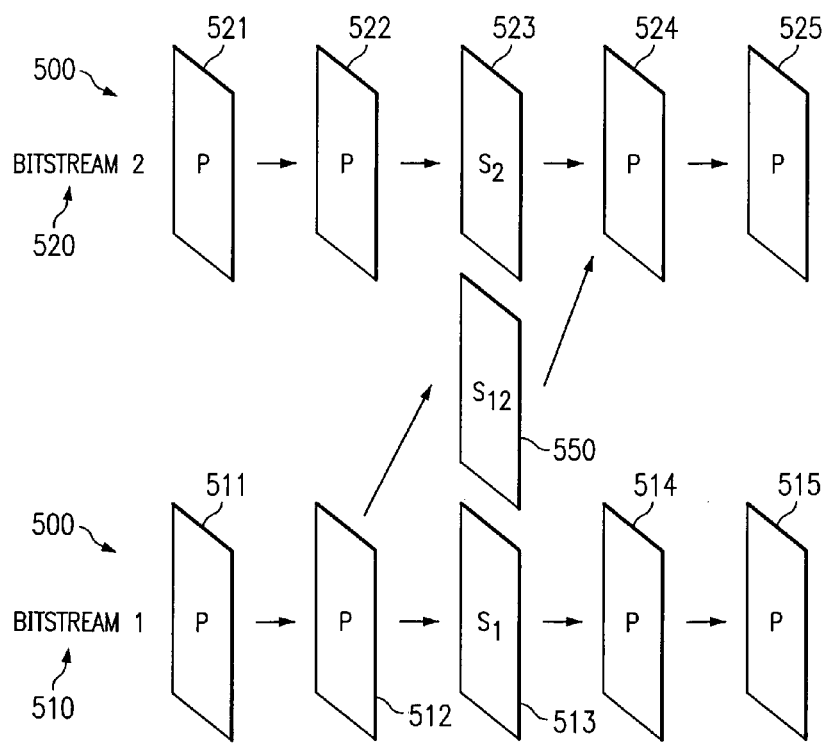
FIG. 5 is an illustration showing switching between bitstreams 1 and 2 using SP-pictures.

Some of possible applications of SP-frames are described below:

Bitstream Switching:

An example of how to utilize SP-frames to switch between different bitstreams is illustrated in the FIG. 5. FIG. 5 shows two bitstreams corresponding to the same sequence encoded at different bitrates—bitstream 1 (510) and bitstream 2 (520). Within each encoded bitstream, SP-pictures should be placed at locations at which one wants to allow switching from one bitstream to another (pictures $S_1$ (513), and $S_2$ (523) in FIG. 5). When switching from bitstream 1 (510) to bitstream 2 (520), another picture of this type will be transmitted (in FIG. 5 picture $S_{12}$ (550) will be transmitted instead of $S_2$ (523)). Pictures $S_2$ (523) and $S_{12}$ (550) in FIG. 5 are represented by different bitstreams. However, their reconstructed values are identical.

Figure 7:
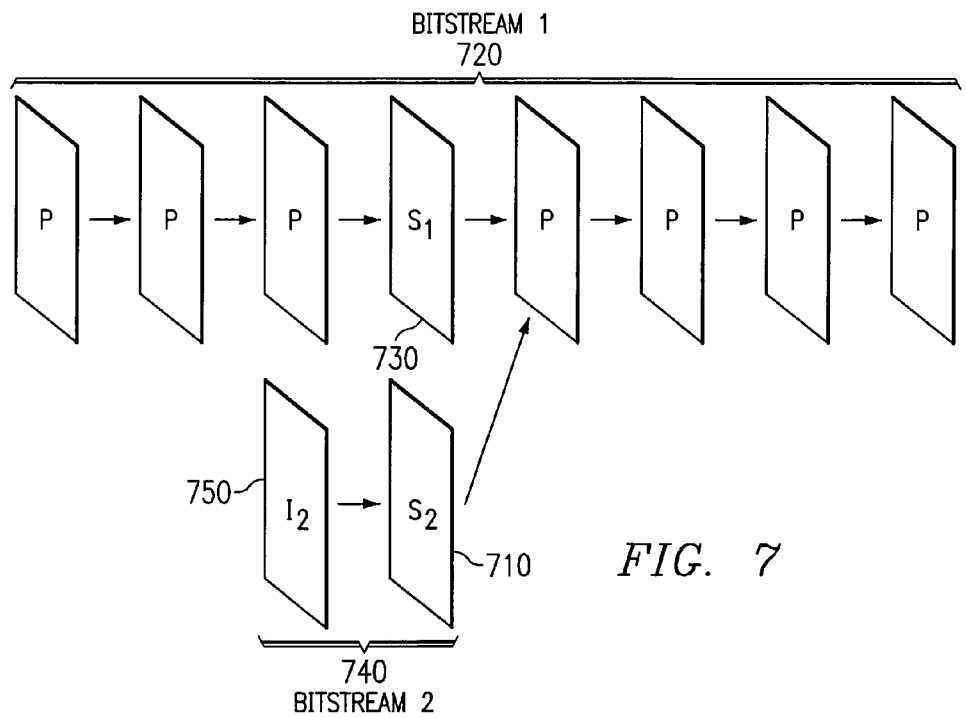
FIG. 7 is an illustration of random access using SP-pictures.
Figure 8:
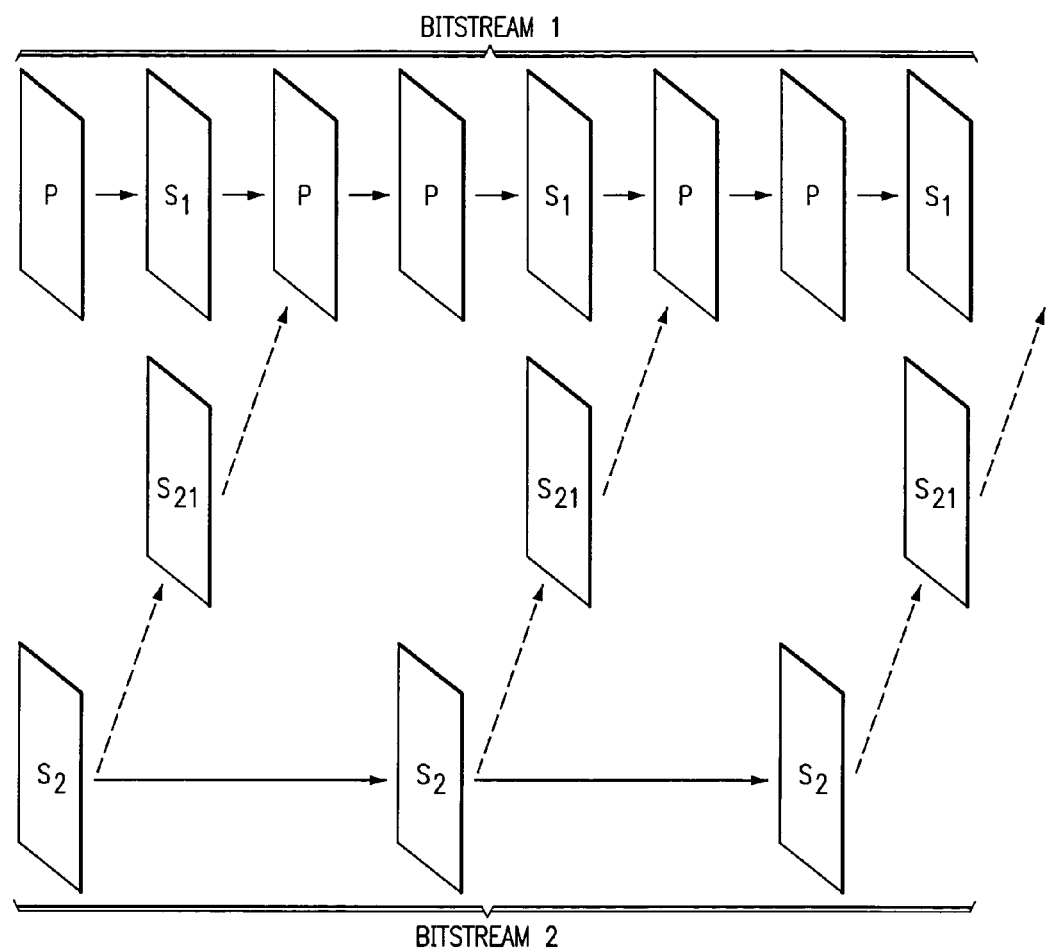
FIG. 8 is an illustration of a fast-forward process using SP-pictures.

Random Access:

Application of SP-pictures to enable random access is depicted in FIG. 7. SP-pictures are placed at fixed intervals within bitstream 1 (720) (e.g. picture $S_1$ (730)) which is being streamed to the client. To each one of these SP-pictures there is a corresponding pair of pictures generated and stored as another bitstream (bitstream 2 (740)):

I-picture, $I_2$ (750), at the temporal location preceding SP-picture.

SP-picture 710, $S_2$, at the same temporal location as SP-picture.

Pictures stored in bitstream 2 (740) are only used when random access is requested by a client. Bitstream 1 (720) may then be accessed at a location corresponding to an I-picture in bitstream 2 (740). For example to access bitstream 1 at frame $I_2$, first the pictures $I_2$, $S_2$ from bitstream 2 are transmitted and then the following pictures from bitstream 1 are transmitted.

Fast-Forward:

If in FIG. 7 bitstream 2 will constitute of only SP-pictures predicted from each other placed in larger temporal intervals (e.g. each 1 sec) the structure presented in this figure can be used to obtain "Fast Forward" functionality. Due to the usage of SP-pictures "Fast Forward" can start at any bitstream location. In similar manner "Fast Backward" functionality can be obtained.

Video Redundancy Coding:

SP-pictures have other uses in applications in which they do not act as replacements of I-pictures. Video Redundancy Coding can be given as an example (VRC). "The principle of the VRC method is to divide the sequence of pictures into two or more threads in such a way that all camera pictures are assigned to one of the threads in a round-robin fashion. Each thread is coded independently. In regular intervals, all threads converge into a so-called sync frame. From this sync frame, a new thread series is started. If one of these threads is damaged because of a packet loss, the remaining threads stay intact and can be used to predict the next sync frame. It is possible to continue the decoding of the damaged thread, which leads to slight picture degradation, or to stop its decoding which leads to a drop of the frame rate. Sync frames are always predicted out of one of the undamaged threads. This means that the number of transmitted I-pictures can be kept small, because there is no need for complete re-synchronization." For the sync frame, more than one representation (P-picture) is sent, each one using a reference picture from a different thread. Due to the usage of P-pictures these representations are not identical. Therefore, mismatch is introduced when some of the representations cannot be decoded and their counterparts are used when decoding the following threads. Usage of SP-pictures as sync frames eliminates this problem.

Error Resiliency/Recovery:

Multiple representations of a single frame in the form of SP-frames predicted from different reference pictures, e.g., the immediate previously reconstructed frames and a reconstructed frame further back in time, can be used to increase error resilience. Consider the case when an already encoded bitstream is being streamed and there has been a packet loss leading to a frame loss. The client signals the lost frame(s) to the sender which responds by sending the next SP-frame in the representation that uses frames that have been already received by the client.

In the following, we provide a detailed description of SP-picture encoding/decoding within the context of H.26L.

SP-frame comprises blocks encoded using spatial correlation among the pixels (intra blocks) and blocks encoded using both spatial and temporal correlation (inter or copy blocks). Inter and copy coded blocks are reconstructed differently than in P-type frames.

Value of each pixel $S(x,y)$ in the inter or copy coded block is decoded as a weighted sum of the basis functions $f_{ij}(x,y)$ where the weigh values $d_{rec}$ will be called dequantized reconstruction image coefficients. The values of $d_{rec}$ are obtained by quantization and dequantization of reconstruction image coefficients $c_{rec}$. Reconstruction image coefficients $c_{rec}$ are formed using Motion compensation prediction of this block constructed using previously transmitted and decoded frames and received motion vectors.

Received quantized prediction error coefficients $I_{err}$.

Values $S(x,y)$ can be further normalized and filtered.

The invention is described in view of certain embodiments. Variations and modification are deemed to be within the spirit and scope of the invention. The changes required in H.26L Test Model in order to implement this embodiment of the present invention are also described.

SP-picture Decoding

The decoding of inter and copy coded blocks in SP-picture is described. Two different values of quantization parameter QP: QP1 and QP2 can be used during quantization/dequantization process for these blocks. Values of QP1 and QP2 can be different when quantization/dequantization process is performed for luma component than when it is performed for chroma component.

The reconstructed values for inter and copy coded blocks are calculated as follows:

1. Form prediction $P(x,y)$ of current block using received motion vectors and the reference frame. Calculate transform coefficients $c_{pred}$ for $P(x,y)$. These coefficients can be calculated by performing forward transform on $P(x,y)$.

2. Calculate reconstruction image coefficients $$c_{rec} = c_{pred} + alpha(QP2) \times I_{err}.$$

where alpha(QP) is a parameter dependent on method of quantization and used QP value. Quantize $c_{rec}$ using quantization parameter QP=QP1. The quantized values will be referred to as quantized reconstructed image coefficients and denoted as I.sub.rec.

When implementing this step in "H.26L Test Model Long Term Number 6 (TML-6) draft0", document VCEG-L45, ITU-T Video Coding Experts Group Meeting, Eibsee, Germany, 9-12 Jan. 2001 to reduce computational complexity calculation of c.sub.rec and their quantization are combined:

$$I.\text{sub.rec} = (c.\text{sub.pred} \times A(QP1) + I.\text{sub.err} \times F(QP1, QP2) + 0.5 \times 2^{20}) // 2^{20}$$

where $F(QP1,QP2) = (2^{20} 33 \ A(QP1) + 0.5 \times A(QP2)) // A(QP2)$. Constant A(QP) is defined above in the section on quantization.

3. Dequantize I.sub.rec using QP=QP1. The dequantized coefficients are equal to d.sub.rec.

4. Inverse transform is performed for d.sub.rec. These values can be further normalized and filtered.

Another Embodiment for SP-Picture Decoding

The blocks with type inter and copy are reconstructed as follows:

1. Form prediction P(x,y) of current block using received motion vectors and the reference frame.

2. Calculate transform coefficients c.sub.pred for P(x,y). These coefficients can be calculated by performing forward transform for P(x,y).

3. Quantize coefficients c.sub.pred using quantization parameter QP=QP1. The quantized values will be referred to as quantized prediction image coefficients and denoted as I.sub.pred. Obtain quantized reconstruction image coefficients I.sub.rec by adding the received quantized coefficients for the prediction error I.sub.err to I.sub.pred, i.e., $$I.\text{sub.rec} = I.\text{sub.pred} + (\text{beta}(QP2) \times I.\text{sub.err} + 0.5 \times \text{beta}(QP1)) // \text{beta}(QP1)$$

where beta(QP) is a parameter dependent on method of quantization and used QP value. In case of quantization used in "H.26L Test Model Long Term Number 6 (TML-6) draft0", document VCEG-L45, ITU-T Video Coding Experts Group Meeting, Eibsee, Germany, 9-12 Jan. 2001, parameter beta (QP)=B(QP) where constant B(QP) is defined above in the section on quantization.

4. Dequantize I.sub.rec using QP=QP1. The dequantized coefficients are equal to d.sub.rec.

5. Inverse transform is performed for d.sub.rec. These values can be further normalized and filtered.

In the following, we describe the encoding of SP-frames for the decoder structure described as the preferred embodiment of the invention.

As can be observed from FIG. 5, there are two types of SP-frames, specifically, the SP-frames; placed within the bitstream, e.g., S.sub.1 (513) and S.sub.2 (523) in FIG. 5, and the SP-frames (S.sub.12 in FIG. 5) that will be sent when there is a switch between bitstreams (from bitstream 1 to bitstream 2). The encoding of S.sub.2 (523) and S.sub.12 (550) are such that their reconstructed frames are identical although they use different reference frames as described below.

When encoding an SP-picture placed within a bitstream (S.sub.1 (513) and S.sub.2 (523) in FIG. 5), the encoding of inter and copy coded blocks is performed as follows:

1. Calculate motion vectors using same method as for P-pictures. After motion compensation calculate transform coefficients for predicted P(x,y) and current image I(x,y) by performing forward transform. The transform coefficients for the current image are denoted as c.sub.orig and for the predicted image as c.sub.pred.

2. Transform coefficients for the predicted blocks are quantized using QP=QP1. Obtained levels are denoted as I.sub.pred.

3. The prediction error coefficients are obtained by c.sub.err=c.sub.orig−I.sub.pred×alpha(QP1) where alpha (QP) is a parameter dependent on method of quantization and used QP value.

When SP-frames are used in "H.26L Test Model Long Term Number 6 (TML-6) draft0", document VCEG-L45, ITU-T Video Coding Experts Group Meeting, Eibsee, Germany, 9-12 Jan. 2001

$$\text{alpha}(QP) = (2^{20} + 0.5 \times A(QP)) // A(QP)$$

where constant A(QP) is defined above in the section on quantization.

4. The prediction error coefficients are quantized using QP=QP2. It is recommended to use rate distortion constrained quantization (RDQ) in which more than one coefficient are considered together in the quantization process. An example of use rate distortion constrained quantization is described in "H.26L Test Model Long Term Number 6 (TML-6) draft0", document VCEG-L45, ITU-T Video Coding Experts Group Meeting, Eibsee, Germany, 9-12 Jan. 2001.

Let as assume that we want to encode the SP-picture, denoted as S.sub.12 in FIG. 5, to switch from bitstream 1 to bitstream 2. The reconstructed values of this picture have to be identical to the reconstructed values of SP-picture in bitstream 2, denoted as S.sub.2 in FIG. 5, to which we are switching. The bitstream of the Intra macroblocks in frame S.sub.2 are copied to S.sub.12. The encoding of inter macroblocks is performed as follows:

1. Form the predicted frame for S.sub.12 by performing motion estimation with the reference frames being pictures preceding S.sub.1 in bitstream 1.

2. Calculate transform coefficients for predicted image by performing forward transform. The transform coefficients for the predicted image are denoted as c.sub.pred.

3. Quantize the obtained coefficients c.sub.pred using QP=QP1 and subtract the quantized coefficient levels I.sub.pred from the corresponding I.sub.rec of S.sub.2-picture. The resulting levels are the levels of the prediction error which will be transmitted to the decoder.

Figure 6:
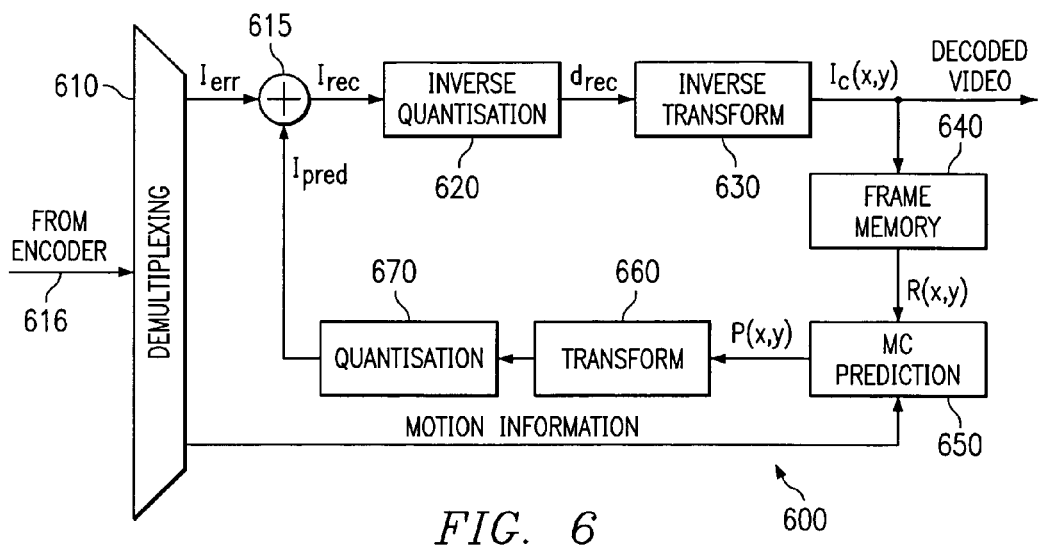
FIG. 6 is a block diagram of a decoder in accordance with an embodiment of the invention.

An embodiment of a decoder 60 in accordance with an embodiment of the invention is illustrated in FIG. 6. Referring to FIG. 6, decoder 600 comprises, inter alia, a demultiplexer 610, inverse quantization block 620, an inverse transform block 630, frame memory 640, MC prediction block 650, transform block 660, quantization block 670.

Figure 9:
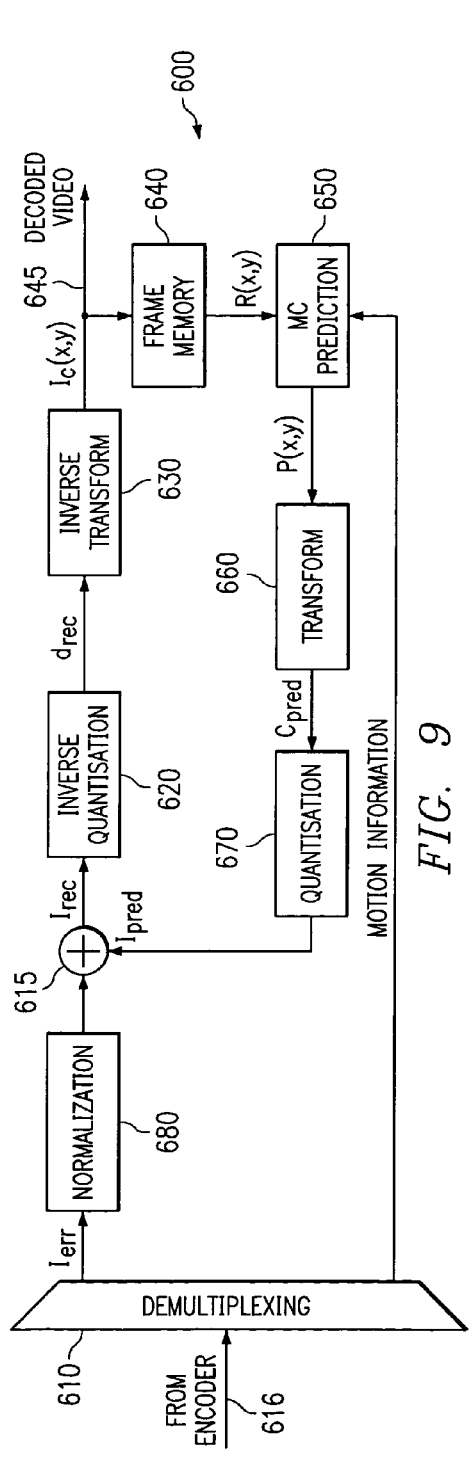
FIG. 9 illustrates a decoder similar to that shown in FIG. 6 except with a normalization of the data received from the demultiplexer, according to the invention.
Figure 10:
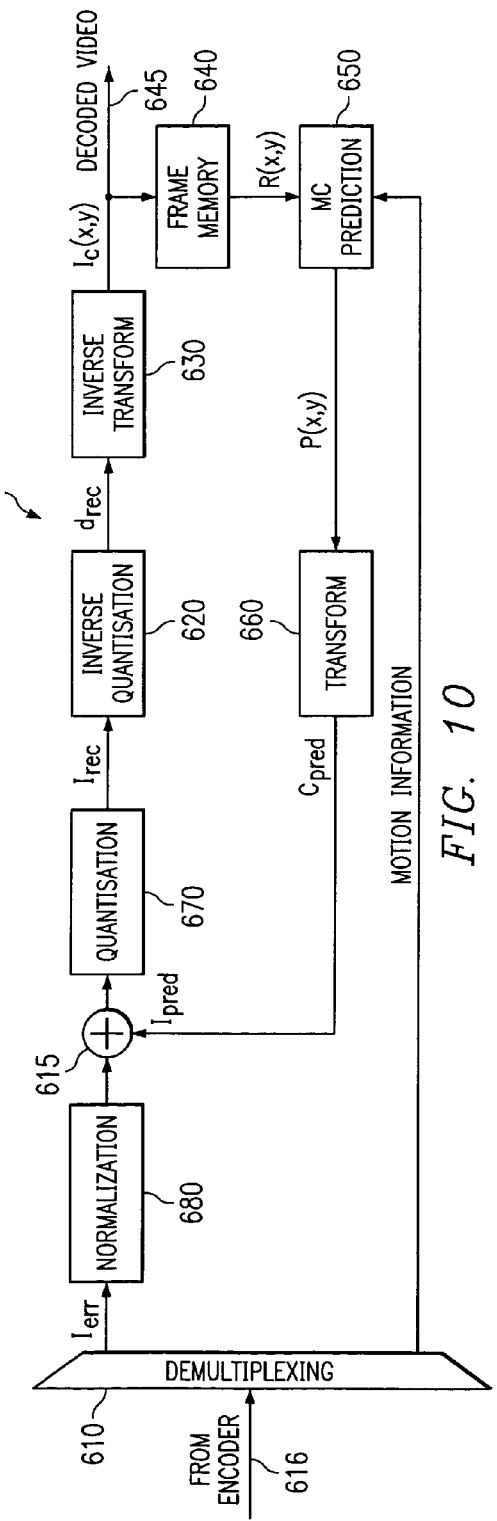
FIG. 10 illustrates another decoder according to the invention and similar to that shown in FIG. 9 except with the quantization 670 after the adder 615.

The invention is described in view of certain embodiments. Variations and modification are deemed to be within the spirit and scope of the invention. For instance, as shown in FIGS. 9 and 10, data from the demultiplexer may be normalized 680 before proceeding to adder and inverse quantization. It will be obvious to those skilled in the art after reading the specification including the appended claims that various changes in form and detail may be made therein without departing from the spirit and scope of the invention.

What is claimed is:

1. A video processing method, said method comprising:
placing a plurality of SP-pictures at fixed intervals within a first bitstream;
generating an I-picture and an SP-picture for each one of said plurality of SP-pictures in said first bitstream;
forming a second bitstream by storing said I-picture at a temporal location preceding said each one of said plurality of SP-pictures in said first bitstream; and storing said SP-picture in said second bitstream at same temporal locations as each of said SP-pictures in said first bitstream.

2. The method of claim 1, wherein said second bitstream comprises only SP-pictures predicted from each other, but at longer temporal periods.

3. The method of claim 1, wherein said first bitstream comprises only SP-pictures predicted from each other, but at longer temporal periods.

4. A decoder comprising:

an input for receiving a first bitstream or a second bitstream, said first bitstream comprising a plurality of SP-pictures at fixed intervals; and said second bitstream comprising an I-picture at a temporal location preceding said each one of said plurality of SP-pictures in said first bitstream and an SP-picture at same temporal locations as each of said SP-pictures in said first bitstream;

an element configured to reconstruct a picture on the basis of said plurality of SP-pictures when the first bitstream is received and further configured to reconstruct a picture on the basis of said I-picture and said SP-pictures stored in the second bitstream when the second bitstream is received.

5. Apparatus, comprising:

means for placing a plurality of SP-pictures at fixed intervals within a first bitstream;

means for generating an I-picture and an SP-picture for each one of said plurality of SP-pictures in said first bitstream;

means for storing said I-picture in a second bitstream at a temporal location preceding said each one of said plurality of SP-pictures in said first bitstream; and means for storing said SP-picture in said second bitstream at same temporal locations as each of said SP-pictures in said first bitstream.

* * * * *